July 2, 1968  C. E. HEIN ET AL  3,390,748
FLUID SHEAR COUPLING
Filed Dec. 27, 1966
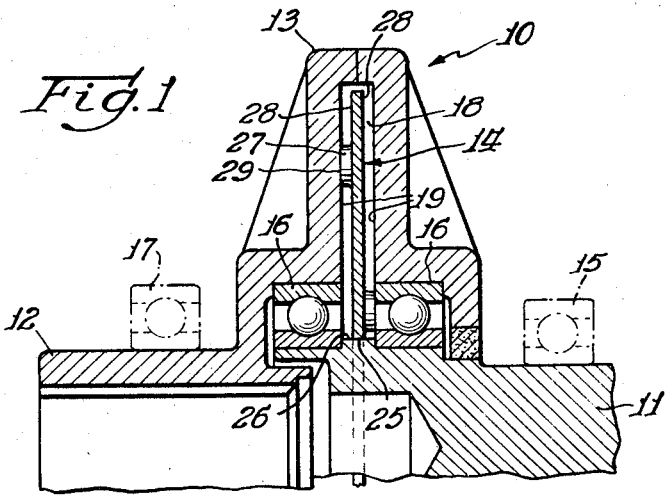
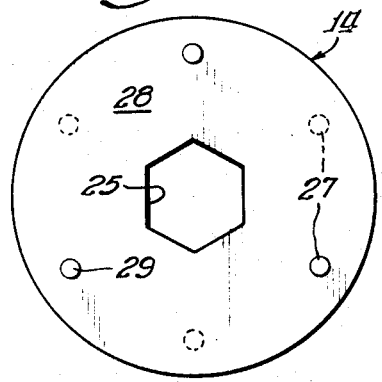
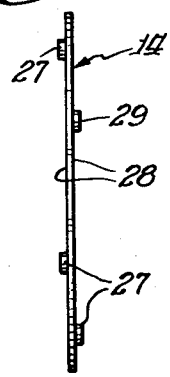
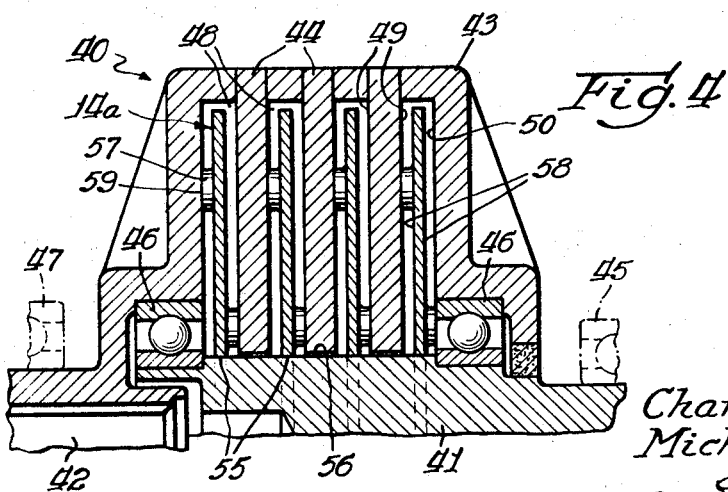
Inventors:
Charles E. Hein and
Michael A. Schober
By: Evan D. Roberts
Atty.

United States Patent Office 3,390,748
Patented July 2, 1968

3,390,748
FLUID SHEAR COUPLING
Charles E. Hein, Newfield, N.Y., and Michael A. Schober, Rosemont, Ill., assignors, by mesne assignments, to Borg-Warner Corporation, Chicago, Ill., a corporation of Delaware
Filed Dec. 27, 1966, Ser. No. 604,747
2 Claims. (Cl. 192—58)

ABSTRACT OF THE DISCLOSURE

A fluid shear coupling wherein a rotating disk is accurately spaced from a drive or driven surface by means of relatively small axially extending projections; thus, the axial dimension of the fluid shear space is accurately controlled without special machining.

---

This invention relates to an improved fluid shear coupling and, in particular, to a fluid shear coupling having an improved structure whereby a drive transmitting shear plate or runner element is readily and accurately positionable with respect to a drive transmitting shear surface element.

In the past, it has been the common practice in the fluid shear coupling art, to provide a fluid chamber in the drive or driven shaft within which one or more drive transmitting runner plates that are secured to the other shaft, are adapted to rotate. Fluid is provided in the chamber to communicate rotational force between the plate and the inner walls of the chamber through the frictional shear resistance of the fluid.

The magnitude of the force that can be transmitted through any given plate, chamber walls and communicating fluid diminishes exponentially with a lineal increase in space between the plate and the chamber wall. Also, inaccurate or slightly twisted mounting of the plates with respect to the chamber walls will provide a highly inefficient and non-uniform transmission of force through the coupling.

Consequently, the plate of a fluid shear coupling must be extremely accurately positioned with respect to the associated chamber walls, so that the space between the plate or plates and the associated chamber walls can be a minimum distance permitted by the tolerances associated with the elements of the coupling, and yet provide the most accurate and uniform transmission of force through the coupling. This is even more critical when a series of plates and chamber surfaces are utilized in a simple coupling, inasmuch as there are multiple clearances and multiple tolerances which will be additive in providing variances which will contribute to inefficiency in fluid shear couplings.

The general objects of this invention are, therefore, to provide an improved fluid shear coupling, wherein the plates thereof can be relatively simply and economically provided, and yet provide a coupling wherein the plates and the associated chamber walls thereof can be accurately and extremely closely positioned in single or stacked relationship without any basic or accumulative enlargement or inaccuracies in the spacings between the plates and the chamber surfaces as measured along the axis of the coupling.

Other objects, advantages, and novel aspects of the invention will become apparent upon consideration of the following detailed description in conjunction with the accompanying drawing wherein:

FIG. 1 is a partial sectional view taken axially along an illustrative improved fluid shear coupling of this invention showing the automatically and accurately positioned plate thereof;

FIG. 2 is an end view of the plate of the fluid shear coupling;

FIG. 3 is a side view of the plate of the fluid shear coupling; and

FIG. 4 is a partial sectional axial view of an improved fluid shear coupling utilizing the automatically and accurately positioned plate thereof in stacked relation with other like plates.

An exemplary version of this invention is illustrated in FIGS. 1–4, wherein FIGS. 1–3 illustrate the improved fluid shear coupling of this invention in the form having a single drive plate, and FIG. 4 illustrates the improved fluid shear coupling of this invention in the form having a series of drive transmitting plates and alternately associated chamber surfaces.

The improved fluid shear coupling is exemplified by the structures illustrated in FIGS. 1–4, and is generally referred to by the numeral 10 (FIGS. 1–3). This coupling includes broadly a first drive transmitting shaft 11, a second drive transmitting shaft 12, an annular housing 13, and a drive plate 14.

The first shaft 11 is typically journalled in a bearing 15, and is provided with bearings 16 on the end periphery thereof. The second shaft 12 is typically journalled in a bearing 17, and the housing 13 of shaft 12 is rotatably mounted on the bearings 16 on the first shaft 11, so that the axes of the shafts 11 and 12 are substantially aligned. The housing 13 is provided with a chamber 18 having axially extending facing annular surfaces 19. The drive plate 14 is provided with an axial hexagonal opening 25 (FIGS. 1 and 2), which is adapted to be slidably received on a complementary hexagonal shaft portion 26 of the first shaft 11 (FIG. 1).

The drive plate 14 of coupling 10 is thereby mounted on the first shaft 11 in a manner whereby it is keyed against relative rotation with respect to the shaft 11, and yet is axially movable on the shaft 11 along the surface 26. It should be noted that although a hexagonal key arrangement is illustrated (FIGS. 1 and 2), other keying arrangements could be utilized between the plate 14 and the shaft 11, whereby the plate is fixed against relative rotation with respect to the shaft 11, and is freely axially movable thereon.

The drive plate 14 is further provided with a series of spaced projections 27 on respective face surfaces 28 thereof. Each projection 27 has an outer surface 29 and the distance between a plane through the flat surfaces 29 of the projections 27 on one side of the plate 14 and a plane through the flat surfaces 29 of the projections 27 on the other side of the plate 14 is substantially equal to the distance between the opposite chamber surfaces 19. The plate 14 is thereby positioned within the chamber 18 with the surfaces 29 of the projections 27 in sliding engagement with the respective surfaces 19 of the housing 13. Thus, the plate 14 will be positioned within the chamber 18 with the distance between the plate 14 and the chamber surfaces 19 determined by the height of the projections 27. This structure, therefore, does not require any provision for any predetermined and specific prelocation structure for the plate 14 on the shaft 11 and is likewise independent of the clearances or tolerances required between the elements of the coupling other than the plate 14 and the projections 27 with respect to the chamber surfaces 19.

Similarly, the modification of the invention illustrated in FIG. 4 provides a stacked or series of plates 14a in a multiple runner type viscous shear coupling generally designated by the numeral 40. In general, the multiple runner coupling 40 includes a first drive transmitting shaft 41, a second drive transmitting shaft 42, an annular housing 43, center plates 44 and a series of the drive plates 14a.

The first shaft 41 of coupling 40 (FIG. 4) is typically journalled in a bearing 45, and is provided with bearings 46 on the end periphery thereof. The second shaft 42 is typically journalled in a bearing 47, and the housing 43 of shaft 42 is rotatably mounted on the bearings 46 on the first shaft 41, so that the axes of the shafts 41 and 42 are substantially aligned. The center plates 44 are secured to a housing 43 in spaced relation and are provided with radial surfaces 49 which in conjunction with spaced radial surfaces 50 of the housing 43 provide a series of chambers 48. The drive plates 14a are provided with an axial hexagonal opening 55, which is further adapted to be slidably received on a complemental hexagonal axial shaft portion 56 of the first shaft 41 (FIG. 4).

The drive plates 14a of coupling 40 are thereby mounted on the first shaft 41 in alternate spaced relation with respect to the center plates 44 and in a manner whereby the plates 44 are keyed against relative rotation with respect to the shaft 41, and yet are axially movable on the shaft 41 along the surface 56 thereof. It should be noted, as in coupling 10, that in the coupling 40, although a hexagonal key arrangement is illustrated and described, other keying arrangements could be utilized between the plates 14a and the shaft 41 whereby the plates 14a would be fixed against relative rotation with respect to the shaft 41 and freely axially movable thereon.

The drive plates 14a are further provided with a series of spaced projections 57 on respective face surfaces 58 thereof. The projections 57 correspond to the projections 27 of plates 14 in the modification illustrated in FIGS. 1–3, and accordingly, plates 14a are similarly respectively positioned within the chambers 48 with the surfaces 59 of the projections 57 in sliding engagement with the respective surfaces 49 of the housing 43 and the center plates 44. Thus, the plates 14a will be respectively positioned within the chambers 48 with the distance between the plates 14a and the chamber surfaces 49 determined by the height of the projections 57 and the axial width of the respective chambers 48. This structure (FIG. 4) therefore does not require any provision for any predetermined and specific prelocation structure for the plates 44 on the shaft 41. Accordingly, the operation of the clutch 40 is substantially independent and, therefore, unaffected by the forces or tolerances required between the elements of the coupling and that of the plates 44 and the projections 57 with respect to the chamber surfaces 49 and 50.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. An improved fluid shear coupling comprising a first rotatably mounted drive transmitting shaft, a second drive transmitting shaft substantially axially aligned with said first shaft, said second shaft having a housing and being rotatably mounted on a portion of said first shaft for relative rotation with respect to said first shaft, said housing having a radially extended chamber therein adjacent said first shaft and having radially extended surfaces perpendicular to the axes of said shafts, drive plate means having radial surfaces, said plate means secured to said first shaft against relative rotation and in axially freely movable relation with respect to said first shaft and between said surfaces of the chamber, projections extending axially from the radial surfaces of said plate means and adapted to respectively slidably engage said radial surfaces of the chamber to axially position said plate means between said surfaces of the chamber, and fluid within the chamber in communication with said plate means and said chamber surfaces for transmitting torque between said first shaft and said second shaft housing through said plate means.

2. An improved fluid shear coupling as defined in claim 1 wherein said housing is provided with a series of axially spaced annular projections providing a series of axially spaced chambers and said plate means being provided in each of the chambers.

References Cited

UNITED STATES PATENTS

| | | | |
|---|---|---|---|
| 973,893 | 10/1910 | Tichomiroff et al. | |
| 2,779,175 | 1/1957 | Hew | 64—30 |
| 2,902,127 | 9/1959 | Hardy. | |

MARTIN P. SCHWADRON, *Primary Examiner.*

C. M. LEEDOM, *Assistant Examiner.*